(No Model.)
S. V. BUSKIRK.
MEANS FOR ATTACHING WATER CLOSET PANS TO THEIR ROCK SHAFTS.
No. 345,667. Patented July 20, 1886.
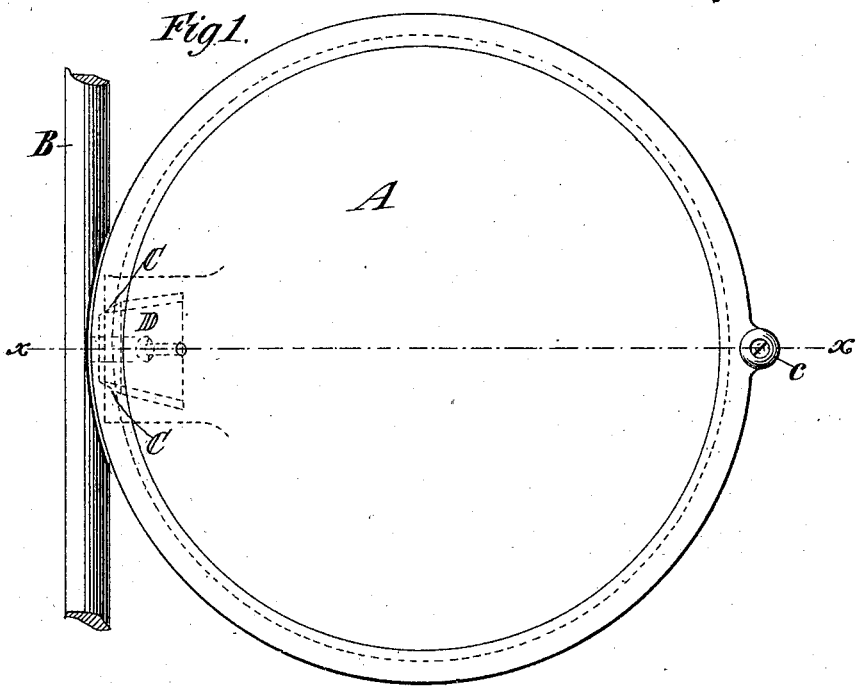
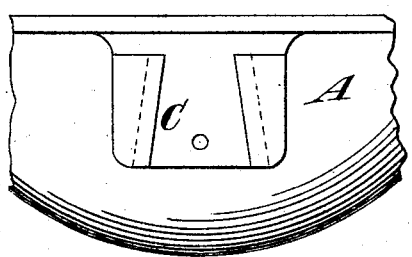
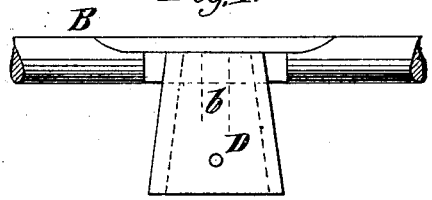
Witnesses.
Inventor
Schuyler V. Buskirk
by his attys
Brown & Hall

UNITED STATES PATENT OFFICE.

SCHUYLER V. BUSKIRK, OF BROOKLYN, NEW YORK.

MEANS FOR-ATTACHING WATER-CLOSET PANS TO THEIR ROCK-SHAFTS.

SPECIFICATION forming part of Letters Patent No. 345,667, dated July 20, 1886.

Application filed December 2, 1885. Serial No. 184,401. (No model.)

*To all whom it may concern:*

Be it known that I, SCHUYLER V. BUSKIRK, of Green Point, Brooklyn, in the county of Kings and State of New York, have invented a new and useful Improvement in Means for Attaching Water-Closet Pans to their Rock-Shafts, of which the following is a specification.

The object of my invention is to enable water-closet pans to be connected with their rock-shafts by simpler means than heretofore, which are of such nature that the pan will be rigidly held to the shaft, and by the shock or blow in opening or closing it will be tightened upon the shaft, and whereby provision is afforded for very readily releasing the pan from the shaft when desired for repair or any other purpose.

The invention consists, essentially, in the combination, with a water-closet pan and its rock-shaft, of a projection or tongue on one, made dovetailed in its transverse section and engaging a groove or slideway, which is also correspondingly dovetailed in its transverse section, in the other part. The tongue or projection and groove or slideway are not only dovetailed in their transverse section, but are preferably also tapered in a direction in which they are moved for engaging them one with the other, and by reason of this taper the pan will have no tendency to slide out of engagement with the rock-shaft when it is in use, but by the shock in opening and closing the pan the tongue or projection will be caused to engage more strongly with or be tightened in the groove or slideway.

The invention also consists in novel features of construction and combinations of parts hereinafter described, and pointed out in the claims.

In the accompanying drawings, Figure 1 is a plan of a water-closet pan and a portion of its rock-shaft connected according to my invention. Fig. 2 is a vertical section upon the plane of the dotted line *x x*, Fig. 1. Fig. 3 is an elevation of a portion of the pan, showing the dovetailed and tapered groove or slideway formed thereon; and Fig. 4 is a corresponding view of a portion of the rock-shaft, provided with a dovetailed and tapered tongue or projection for engaging said groove or slideway.

Similar letters of reference designate corresponding parts in all the figures.

A designates the pan, and B the rock-shaft. In the example of my invention illustrated, the pan A is provided with a dovetailed groove or slideway, C, and the rock-shaft B is provided with a downwardly-extending tongue or projection, D, which is dovetailed correspondingly to the groove or slideway C. The rock-shaft, with its tongue or projection formed integral therewith, may be of cast-brass, malleable cast-iron, or other metal, and the pan may be made of copper or sheet-iron pressed or stamped into shape, or it may be made of malleable cast-iron, and enameled or not, as may be desired. When the pan is made of cast metal, the dovetailed groove or slideway C may be formed integral with the pan in the operation of casting; but if the pan be of wrought or stamped metal the groove or slideway may be formed in a plate or piece riveted or otherwise secured to the pan. The groove or slideway and tongue or projection C D are not only dovetailed at their edges, so as to prevent the disengagement of the pan from the rock-shaft by a movement transverse to the length of the tongue or projection, but both the slideway and tongue are tapered upwardly, as best shown in Figs. 3 and 4.

In order to connect the pan and rock-shaft, the upper end of the tongue or projection D is entered into the lower end of the groove or slideway C, and slid upward therein until it comes to a tight fit with the rock-shaft B near the upper edge of the pan, or just below the rim thereof. By reason of the taper form of the slideway C and the tongue or projection D the weight of the pan and the force exerted in raising it will both tend to force the tongue or projection upward into the taper groove or slideway C, and will maintain a tight connection of the pan with the rock-shaft. If desired, a screw, *a*, may be inserted through the tongue or projection and into the pan or the piece in which the groove or slideway C is formed, as is shown in Fig. 2, and in order to strengthen the connection of the tongue or projection with the rock-shaft I may form upon the back of the tongue or projection a strengthening-rib, as shown at *b*.

From the above description it will be readily understood that I not only attach the pan very securely to the rock-shaft, so that there is no danger of their becoming disconnected while in use, but I also provide for readily detaching the pan from the rock-shaft when it is desired to renew either of them, or to make any other repairs.

On the side of the pan opposite the rock-shaft I have shown a rubber cushion, c, to strike against the hopper and lessen the shock when the pan is raised.

I am aware that it is not new to provide a closet-pan with a loop or staple, and to provide the rock-shaft with a downwardly extending and parallel-sided arm, which is inserted into the loop or staple, the shaft being rigidly secured to the pan by screws inserted through the rim or flange of the pan and downward into the shaft.

What I claim as my invention, and desire to secure by Letters Patent, is—

1. The combination, with a water closet pan and its rock-shaft, of a tongue or projection on one, dovetailed in its transverse section and engaging a correspondingly-dovetailed groove or slideway in the other, substantially as herein described.

2. The combination, with a water-closet pan and its rock-shaft, of a tongue or projection on one, which is dovetailed in its transverse section and tapered in the direction of its length, and a groove or slideway in the other, also dovetailed in its transverse section and tapered in the direction of its length, substantially as herein described.

3. The combination, with a water-closet pan having upon its exterior a groove or slideway, C, which is dovetailed in its transverse section, of a rock-shaft provided with a downwardly-extending tongue or projection, D, which is also dovetailed in its transverse section and engages with said groove or slideway, substantially as herein described.

4. The combination, with a water-closet pan having upon its exterior a groove or slideway, C, dovetailed in its transverse section and tapered in the direction of its length, of a rock-shaft having a downwardly-extending tongue or projection, D, also dovetailed in transverse section and tapered in the direction of its length, and which engages said groove or slideway, and a screw, a, inserted through the tongue or projection in a direction transverse to the length and entering the back of the slideway, substantially as herein described.

SCHUYLER V. BUSKIRK.

Witnesses:
FREDK. HAYNES,
M. LINDEMAN.